United States Patent [19]

Mattison

[11] Patent Number: 4,700,504
[45] Date of Patent: Oct. 20, 1987

[54] FISHING LURE

[76] Inventor: Robert N. Mattison, 5826 McKinley Pl. North, Seattle, Wash. 98103

[21] Appl. No.: 892,129

[22] Filed: Jul. 30, 1986

[51] Int. Cl.$^4$ .............................................. A01K 85/01
[52] U.S. Cl. ................................... 43/42.33; 43/17.6; 43/42.47
[58] Field of Search ................. 43/42.33, 42.34, 42.06, 43/42.47, 43.09, 42.48, 17.6, 17.5

[56] References Cited

U.S. PATENT DOCUMENTS

| | | | |
|---|---|---|---|
| 272,317 | 2/1983 | Pflueger | 43/17.6 |
| 756,438 | 4/1904 | Uhlenhart | |
| 2,117,206 | 5/1938 | Neff | |
| 2,674,058 | 4/1954 | Lindenberg | 43/42.06 |
| 2,752,721 | 7/1956 | Denny | 43/42.33 |
| 2,791,058 | 5/1957 | Bettini | 43/42.06 |
| 2,797,517 | 7/1957 | Eriksen | 43/42.06 |
| 3,363,359 | 1/1968 | Oney | 43/42.47 |
| 3,434,230 | 3/1969 | Littlefield | 43/42.06 |
| 3,568,354 | 3/1971 | Yacko | 43/17.6 |
| 3,576,987 | 5/1971 | Voight et al. | |
| 3,579,895 | 5/1971 | Orn et al. | 43/17.6 |
| 3,597,362 | 9/1971 | Bollyky et al. | |
| 3,708,903 | 1/1973 | Bercz et al. | 43/42.46 |
| 3,762,092 | 10/1973 | Bercz et al. | 43/17.6 |
| 3,861,072 | 1/1975 | Holcombe | 43/17.6 |
| 3,863,380 | 2/1975 | Purlia | 43/17.6 |
| 3,895,455 | 7/1975 | Johnston | 43/17.6 |
| 3,918,190 | 11/1975 | Hornbeck | 43/17.6 |
| 3,921,328 | 11/1975 | Holcombe | 43/17.6 |
| 3,940,868 | 3/1976 | Northcutt | 43/17.6 |
| 4,074,455 | 2/1978 | Williams, Jr. | 43/42.06 |
| 4,208,823 | 6/1980 | Hershberger | 43/42.09 |
| 4,581,839 | 4/1986 | Mattison | 43/17.6 |
| 4,589,221 | 5/1986 | Mattison | 43/17.6 |
| 4,610,103 | 9/1986 | Steinman | 43/42.06 |

FOREIGN PATENT DOCUMENTS

| | | |
|---|---|---|
| 2757998 | 6/1979 | Fed. Rep. of Germany . |
| 1594610 | 7/1970 | France . |
| 2231314 | 5/1973 | France . |
| 232268 | 1/1975 | France . |
| 59225 | 4/1938 | Norway . |

OTHER PUBLICATIONS

Preview '85, New From Sevenstrand, Fishing Tackle Retailer Magazine, Jul. 1984, Dandy-Glo, manufactured by Dandy-Glo Tackle, Inc.

Primary Examiner—Gene P. Crosby
Attorney, Agent, or Firm—Seed and Berry

[57] ABSTRACT

A fishing lure with a hollow body fabricated of transluscent fluorescent polymer material with opposing sidewall portions having interior scale-like protrusions with smooth surface portions and edge surface portions. A transluscent cylindrical holder is transversely positioned within the body to receive a chemiluminescent capsule. A double-sided light reflective sheet is centrally positioned within a cavity formed within the body and extends rearwardly between the protrusions formed on each body sidewall to reflect light generated by the capsule and ambient light outward toward the protrusions. The light impinging upon the protrusion smooth portions is converted to fluorescent light and intensified for emission from the edge portions at a high brightness level. A stabilizer fin is attached to the body and extends upwardly thereform, and a diving plane is fixedly attached to the body and extends forwardly therefrom to cause the body to dive during usage in a stable manner while providing a side-to-side darting motion.

23 Claims, 6 Drawing Figures

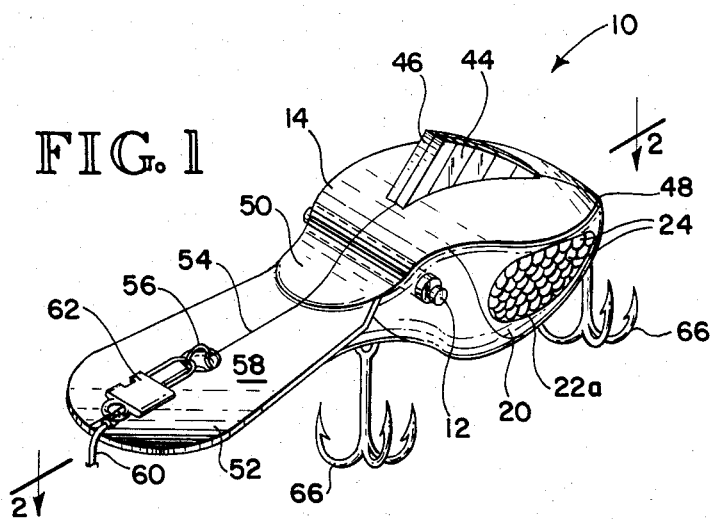
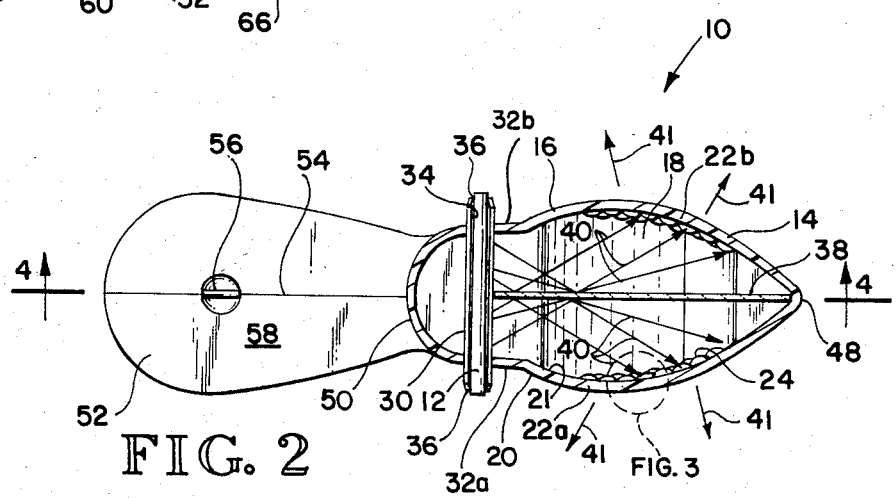
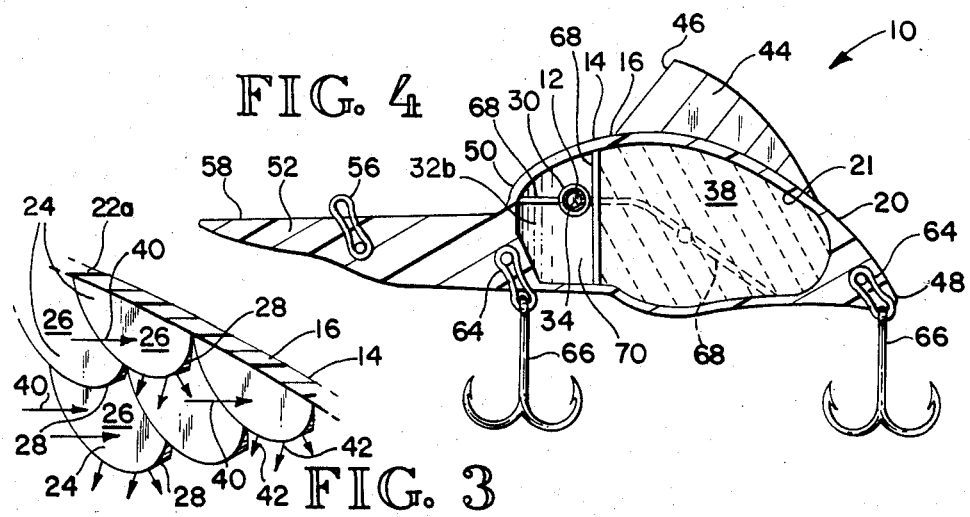

FISHING LURE

DESCRIPTION

1. Technical Field

The present invention relates generally to fishing equipment, and more particularly to illuminated fishing lures.

2. Background of the Invention

In the past many attempts have been made to improve the ability of fishing lures to attract fish by enhancing reflective or illuminative properties of the lures. For example, electrically powered lights have been tried in conjunction with fishing lures. Many problems are associated with the use of electrical lights in an underwater environment. As an alternative, fluorescent paint has been used on fishing lures. The amount of illumination provided by such lures, however, is minimal. This is particularly true when fishing on cloudy days or at substantial depths.

Attempts to provide increased illumination have been enhanced by the creation of small chemiluminescent capsules, commonly known as "light sticks". Such capsules typically comprise a sealed glass tube containing a first chemical housed within an outer resilient plastic tube. A second chemical is housed intermediate the tubes. By bending the outer resilient tube, the inner glass tube can be broken to allow the two chemicals to mix and react, causing illumination of the capsule. Chemiluminescent capsules of this type are described in detail in U.S. Pat. No. 3,576,987.

Chemiluminescent capsules are attractive for use with fishing lures because they overcome the problem of electrical and fluorescent systems. Various attempts have been made to utilize chemiluminescent capsules in fishing lures such as shown in U.S. Pat. Nos. 3,861,072; 3,895,455; 3,921,328; and 3,863,380. Other fishing lures using chemiluminescent capsules are shown in applicant's U.S. Pat. Nos. 4,581,839 and 4,589,221. Many of these fishing lures, however, do not maximize the use of the light produced by the chemiluminescent capsule to attract fish by simulating the shimmering appearance or flash-like effect produced by a bait fish darting about. Rather, the lures produce only a large constantly glowing light having a centralized elongated source of light. Moreover, none of these lures have the ability to dive deeply as they are pulled along underwater on a fishing line while providing a desirable side-to-side darting action which simulates a bait fish. The present invention is embodied in an improved fishing lure which provides these and other related advantages.

DISCLOSURE OF THE INVENTION

The present invention resides in a fishing lure. In a preferred embodiment of the invention, the lure houses an elongated chemiluminescent capsule for illumination of the lure.

The lure has a substantially hollow body formed by a wall fabricated of translucent fluorescent polymer material having the property of capturing light, converting the light to fluorescent light, intensifying the light and emitting the light from edges at high brightness levels. In a preferred embodiment, the body walls are thin and fish-like shaped. The body wall defines an interior waterproof body cavity.

The body has opposing sidewall portions, with at least one surface of the sidewall portion having formed thereon a plurality of smooth surface portions and surface discontinuities. More specifically, the body has a pair of opposing rearward sidewall portions each with a smooth exterior surface and an interior surface. The interior surface has formed integrally thereon a plurality of scale-like protrusions each having a smooth surface portion facing generally inward which terminates in an edge surface portion angularly oriented generally perpendicular to the body wall.

Means are provided for removably holding the chemiluminescent capsule in transverse position within the body for light transmitted from the capsule to impinge upon the sidewall surface portions. In the preferred embodiment, a translucent cylindrical holder is positioned within the body forward of the rearward sidewall portions and extends transversely between opposing forward sidewall portions of the body sidewall. Each end of the holder extends through and is in sealing engagement with the forward sidewall portions to support the holder and prevent leakage of fluid into the body cavity. The holder has a longitudinal bore with an interior diameter substantially equal to the diameter of the chemiluminescent capsule. The bore extends through the holder end and terminates in an opening to each side of the body communicating with the exterior of the bore to enable the capsule to be slid into and out of the bore through the openings by the user in preparation for usage of the lure and replacement of the capsule and to frictionally retain the capsule in the bore during usage of the lure.

A double sided light reflective sheet is centrally positioned within the cavity with each of the sides thereof facing toward a corresponding one of the sidewall surface portions to reflect light generated by the capsule outward toward the sidewall surface portions. As such, light reflecting off the sheet and impinging on the sidewall surface portions is emitted from the surface discontinuities with a high brightness level.

In a preferred embodiment of the invention, the lure further includes a stabilizer fin fixedly attached to the body and projecting upwardly above the body to stabilize the body during usage. A diving plane is fixedly attached to the body wall and projects forwardly from the body to cause the body to dive during usage. An attachment member is fixedly attached to the diving plane for attachment of a fishing line to pull the lure during usage.

The fin has a rearwardly inclined, forwardly facing blunted surface to provide a generally rearward stabilizing resistive force on the body during usage to prevent the body from looping. The fin is positioned sufficiently forward of a rearward end of the body to permit limited side-to-side motion of the body during usage, and sufficiently rearward of a forward end of the body to prevent the body from looping.

When viewed from above, the diving plane is sized with a plan area generally equal to the plan area of the body. The attachment member is attached to the diving body at a position with about 20% to 30% of the combined plan area of the diving plan and the body forward thereof.

When viewed from the front the blunted fin surface has a frontal area generally equal to at least 5% of the frontal area of the body. When viewed from the side the fin has a side profile area generally equal to at least 15% of the combined surface profile area of the body and the fin. The body has a rearward end portion which, when viewed from the side, tapers rearwardly to a point to offer minimum resistance to side-to-side motion of the body.

Other features and advantages of the invention will become apparent from the following detailed description taken in conjunction with the accompanying drawings.

BRIEF DESCRIPTION OF THE DRAWINGS

FIG. 1 is an isometric view of a fishing lure embodying the present invention.

FIG. 2 is a cross-sectional view taken substantially through the line 2—2 of FIG. 1.

FIG. 3 is an enlarged fragmentary sectional view of an interiorly scaled sidewall portion of the lure in the area generally indicated in FIG. 2 by dashed lines.

FIG. 4 is a cross-sectional view taken substantially through the line 4—4 of FIG. 2.

BEST MODE FOR CARRYING OUT THE INVENTION

Figure 5:
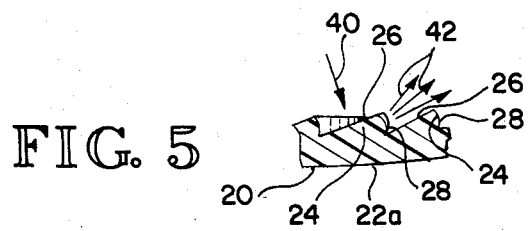
FIG. 5 is an enlarged fragmentary, sectional view of the scaled sidewall portion of FIG. 3 illustrating another embodiment of the scales.

As shown in the drawings for purposes of illustration, the present invention is embodied in an illuminated fishing lure, indicated generally by reference numeral 10. The lure 10 is designed for deep diving while providing a highly desirable side-to-side motion simulating a darting bait fish. The lure 10 houses an elongated chemiluminescent capsule 12 with a generally circular cross-section and a resilient outer tubular casing. The chemiluminescent capsule 12 is activated by bending the capsule to break an inner glass tube, and when activated produces chemiluminescene. As will be described below, the lure 10 is designed to maximize use of the light produced by the capsule and also of ambient light to attract fish by providing the lure with a shimmering appearance or flash-like effect, much like the appearance of a darting live bait fish.

In the presently preferred embodiment of the invention, the lure 10 has a substantially hollow body 14 formed by a fish-like shaped thin wall 16. The body wall 16 defines an interior waterproof body cavity 18.

The body wall 16 has a smooth exterior surface 20 and an interior surface 21 with opposing rearward left and right sidewall portions 22a and 22b, respectively. Each of the sidewall portions 22a and 22b has a plurality of scalloped or fish scale-like protrusions 24 formed integrally on the interior surface 21 of the body wall 16. Each protrusion 24 has a smooth, generally inward facing surface portion 26 which terminates in a generally downward facing edge surface portion 28. The edge surface portion 28 is angularly oriented generally perpendicular to the body wall 16 and provides a surface discontinuity or disruption from which light is emitted, as will be described below.

The body wall 16 is fabricated of a translucent fluorescent polymer material having the property of capturing light incident thereon, converting the light to fluorescent light, intensifying the captured light and emitting the light from edges at high brightness levels. One such fluorescent polymer material is manufactured by Mobay Chemical Corporation of Mobay Road Pittsburgh, Pa. under the name "LISA." When manufactured of such a fluorescent polymer material, light produced by the chemiluminescent capsule incident upon the smooth surface portion 26 of the protrusions 24 as well as light transmitted through the body wall 16 from other parts thereof is converted to fluorescent light and emitted at a high brightness level light along the edge surface portions 28 of the protrusions 24. Ambient light striking the body wall 16 similarly produces light at the edge surface portions 28. Even when just exposed to ambient light, the result is a high brightness level light emitted along the edge surface portions 28 which is visibly brighter than the ambient light level. The light from the capsule 12 further enhances this brightness and in a low ambient light conditions such as when the lure 10 is at substantial depths or on cloudy days, the capsule provides the primary source of light energy.

Although the protrusions 24 are formed on the interior surface 21 of the body wall 16, the edge surface portions 28 emit light with an illumination level brighter than the surrounding body wall. The transluscent nature of the material used, causes the bright edges to be visible through the body wall when viewed from outside the body, such as a fish would view the lure. Since the protrusions 24 are inside the body cavity 18 they are protected from damage by usage or handling of the lure. By using a plurality of protrusions 24 with edge surface portions 28, the effect created is much like the shimmering light reflected off of a bait fish as it darts about. This is to be compared to conventional lures using chemiluminescent capsules which merely produce a constantly glowing centralized elongated source of light.

To hold the chemiluminescent capsule 12, the lure 10 further includes a transluscent cylindrical holder 30 which is positioned within the body 14 forward of the rearward sidewall portions 22a and 22b. The holder 30 extends transversely between left and right forward sidewall portions 32a and 32b, respectively, of the body wall 16 at about the normal position for the eyes of the fish-like shaped body 14. Each end of the holder 30 extends through and is in sealed engagement with the forward sidewall portions of 32a and 32b to support the holder and prevent leakage of water into the body cavity 18.

The holder 30 has a longitudinally extending bore 34 with an interior diameter substantially equal to the diameter of the chemiluminescent capsule 12. The bore 34 extends through the ends of the holder 30 and terminates in an opening 36 to each side of the body 14 communicating with the exterior of the lure 10. This enables the chemiluminescent capsule 12 to be slid into and out of the bore 30 through the openings 36 by the user in preparation for usage of the lure 10 or for replacement of the capsule. The light produced by the capsule 12 is of limited duration, and the capsule must be replaced when exhausted. The diameter of the bore is selected so as to frictionally retain the capsule within the bore during usage of the lure. It is noted that other means for retaining the capsule within the bore may be utilized.

A double sided light reflective tape or sheet 38, preferably a silver prism tape, is centrally positioned within the cavity 18 between the left and right rearward sidewall portions 22a and 22b. The sheet 38 extends longitudinally from a forward position in the cavity 18 adjacent to the holder 30 to a rearward position in the cavity rearward of the rearward sidewall portions 22a and 22b. Each side of the sheet 38 faces toward a corresponding one of the rearward sidewall portions 22a and 22b to reflect light incident thereon generated by a corresponding longitudinal half of the capsule 12 outward toward the corresponding rearward sidewall portion 22a or 22b. Additionally, ambient light passing through the body wall 16 is reflected back toward the rearward sidewall portion and further increases the light impinging upon the rearward sidewall portions.

As discussed above, light impinging upon the protrusion surface portion 26 of the rearward sidewall portions 22a and 22b is captured and converted to fluorescent light, intensified or effectively gathered, and then emitted from the edge surface portions 28. Light from the capsule and ambient light impinging on other portions of the body wall 16 is also captured and emitted at the edge surface portions 28. The results is to accentuate the light by providing a large number of small, but bright edge surface portions emitting neon-like fluorescent light extending over large areas of the lure's sides to improve the lure's appearace to a fish. It is noted that in addition to the light emitted by the edge surface portions 28, the outward ends of the chemiluminescent capsule 12 extend beyond the holder 30 and provide a spot of intense light to each side of the lure in a position simulating the glowing eyes of a fish.

For purposes of illustration, light rays indicated by arrows 40 are shown in FIGS. 2, 3 and 5 to demonstrate the path of the light generated by the chemiluminescent capsule 12 reflecting off the reflective sheet 38 and impinging upon the smooth surface portions 26 of the protrusions 24 formed on the rearward sidewall portions 22a and 22b. In FIGS. 3 and 4, arrows 42 indicate the intensified light rays being emitted along the edge surface portions 28. In FIG. 2, arrows 41 indicate the light rays emitted from the edge surface portions 28 which are seen from the exterior of the lure 10.

In an alternative embodiment shown in FIG. 5, the edge surface portions 28' have a convex shape to provide a wider angle of light emission. In the embodiment shown in FIG. 3, th edge surface portions 28 have a generally flat surface when viewed in cross-section.

The lure 10 further includes a stabilizer fin 44 fixedly attached to the body wall 16 and projecting upwardly above the body 14 to stabilize the body during usage. The fin 44 is centrally located and extends longitudinally along the body 14, and tapers rearwardly to the body wall 16. The fin 44 has a rearwardly inclined, forwardly facing blunted or flat surface 46. The flat surface 46 provides a generally rearward stabilizing resistive force on the body when water hits the surface as the lure is pulled along during usage to help prevent the body from rolling or looping. The fin 44 is positioned sufficiently forward of a rearward end 48 of the body 14 to permit limited side-to-side motion of the body during usage, and sufficiently rearward of a forward end 50 of the body to help prevent the body from rolling or looping.

A diving plane 52 is fixedly attached to the body wall 16 and projects forwardly from the body 14 to cause the body to dive during usage. In the presently preferred embodiment of the invention, the diving plane 52, the fin 44 and the body 14 are molded as an integral unit with the left and right lure halves being molded separately and then joined together by adhesive along a longitudinally extending center line 54.

Figure 6:
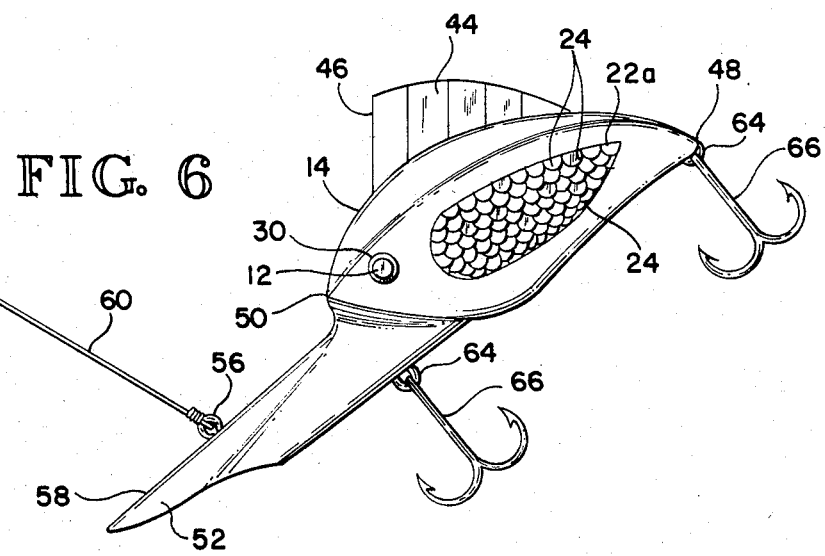
FIG. 6 is a left side view showing the lure of FIG. 1 with the attitude attained during usage when pulled by a fishing line.

A metallic attachment ring 56 is pinned between the two lure halves when they are joined and projects upwardly above a flat upper surface 58 of the diving plane 52. The attachment ring 56 provides a point for attachment of a fishing line 60, either directly as shown in FIG. 6 or through a snap as shown in FIG. 1, for pulling the lure during usage. The lure 10 also includes two other attachment rings 64 pinned between the two lure halves which extend below the lure for attachment of a pair of hooks 66.

In the preferred embodiment of the invention, when viewed from above, the flat upper surface 58 of the diving plane 52 is sized with a plan area generally equal to the plan area of the body 14. With a diving plane 52 so large relative to the size of the body 14, the lure 10 is provided with unusually good diving ability. It is, however, extremely unstable and tends to do loops or rolls as it travels without the stability provided by the fin 44. It has been found that the size and position of the fin is extremely important. If the fin is moved too far toward the body rearward end 48, the fin acts much like a feather on an arrow and causes the lure to travel in a straight line without any desirable side-to-side motion to simulate a darting fish. If the fin is moved too far forward toward the body forward end 50, the fin cannot prevent looping or rolling of the lure as it is pulled along. Moreover, it has been found important to locate the attachment ring 56 to the diving plane 52 at a position with about 20% to 30% of the combined plan area of the diving plane 52 and the body 14 forward of the attachment point.

Stability is improved by using a fin which, when viewed from the front, blunted fin surface 46 has a frontal area generally equal to at least 5% of the frontal area of the body 14, and when viewed from the side, has a side profile area generally equal to at least 15% of the combined side profile area of the body and the fin. To further promote side-to-side motion of the body, the body 14, when viewed from the side, tapers rearwardly to a point at the body rearward end 48 to offer minimum resistance to the side-to-side motion.

The lure 10 has walls 68 interior of the cavity 18 and molded integral with the body 14 to provide structural strength to the body. The walls 68 also help hold the reflective sheet 38 in position, and form an interior forward chamber 70 below the holder 30 into which ballast weights (not shown) can be inserted during assembly of the lure.

It will be appreciated, that although specific embodiments of the invention have been described herein for purposes of illustration, various modifications may be made without departing from the spirit and scope of the invention. Accordingly, the invention is not limited except as by the appended claims.

I claim:

1. An illuminated fishing lure for housing an elongated chemiluminescent capsule, comprising:

a substantially hollow body formed by a fish-like shaped thin wall fabricated of a translucent fluorescent polymer material having the property of capturing light, converting the light to fluorescent light, intensifying the light and emitting the light from edges at high brightness levels, said body wall defining an interior waterproof body cavity and having opposing rearward sidewall portions each with a smooth exterior surface an an interior surface, said interior surface having formed integrally thereon a plurality of scale-like protrusions each having a smooth surface portion facing generally inward which terminates in an edge surface portion angularly oriented generally perpendicular to said body wall;

a translucent cylindrical holder positioned within said body forward of said rearward sidewall portions and extending transversely between opposing forward sidewall portions of said body wall, each end of said holder extending through and being in sealed engagement with said forward sidewall portions to support said holder and prevent leakage of fluid into said body cavity, said holder having a longitudinal bore with an interior diameter substantially equal to the diameter of the chemiluminescent capsule, said bore extending through said holder ends and terminating in an opening to each side of said body communicating with the exterior of the lure to enable the capsule to be slid into and out of said bore through said openings by the user in preparation for usage of the lure and for replacement of the capsule and to frictionally retain the capsule in said bore during usage of lure;

a double sided light reflective sheet centrally positioned within said cavity with each side thereof facing toward a corresponding one of said rearward portions of said body wall to reflect light generated by the capsule outward toward said rearward sidewall portions, said sheet extending longitudinally from a forward portion of said cavity adjacent to said holder to a rearward portion of said cavity rearward of said rearward sidewall portions, whereby light reflected off said sheet and impinging on said protrusion smooth surface portions is emitted from said protrusion edge surface portions;

a stabilizer fin fixedly attached to said body wall and projecting upwardly above said body to stabilize said body during usage;

a diving plane fixedly attached to said body wall and projecting forwardly from said body to cause said body to dive during usage; and an attachment member fixedly attached to an upper surface of said diving plane for attachment of a fishing line to pull the lure during usage.

2. The fishing lure of claim 1 wherein said fin has a rearwardly inclined, forwardly facing blunted surface to provide a generally rearward stabilizing resistive force on said body during usage to prevent said body from looping.

3. The fishing lure of claim 2 wherein said fin is positioned sufficiently forward of a rearward end of said body to permit limited side-to-side motion of said body during usage, and sufficiently rearward of a forward end of said body to prevent said body from looping.

4. The fishing lure of claim 1 wherein when viewed from above said diving plane is sized with a plan area generally equal to the plan area of said body, and said attachment member is attached to said diving plane at a position with from about 20 to 30% of the combined plan area of said diving plane and said body forward thereof.

5. The fishing lure of claim 4 wherein said fin has a rearwardly inclined, forwardly facing blunted surface, and when viewed from the front said blunted surface has a frontal area generally equal to at least 5% of the frontal area of said body, and when viewed from the side said fin has a side profile area generally equal to at least 15% of the combined side profile area of said body and said fin.

6. The fishing lure of claim 5 wherein said body has a rearward end portion when viewed from the side which tapers rearwardly to a point to offer minimum resistance to side-to-side motion of said body.

7. An illuminated fishing lure for housing an elongated chemiluminescent capsule, comprising:

a substantially hollow body formed by a wall fabricated of a translucent fluorescent polymer material, said body wall defining an interior waterproof body cavity and having opposing sidewall portions, at least one surface of said sidewall portions havinig formed thereon a plurality of smooth surface portions and surface discontinuities;

means for removably holding the chemiluminescent capsule in transverse position within said body for light transmitted from the capsule to impinge upon said sidewall surface portions; and a double sided light reflective sheet centrally positioned within said cavity with each said side thereof facing toward a corresponding one of said sidewall surface portions to reflect light generated by the capsule outward toward said sidewall surface portions, whereby light reflected off said sheet and impinging on said sidewall surface portions is emitted from said surface discontinuities with a high brightness level;

8. The fishing lure of claim 7 further including;

a stabilizer fin fixedly attached to said body wall and projecting upwardly above said body to stabilize said body during usage;

a diving plane fixedly attached to said body wall and projecting forwardly from said body to cause said body to dive during usage; and an attachment member fixedly attached to said diving plane for attachment of a fishing line to pull the lure during usage.

9. The fishing lure of claim 8 wherein said fin has a rearwardly inclined, forwardly facing blunted surface to provide a generally rearward stabilizing resistive force on said body during usage to prevent said body from rolling.

10. The fishing lure of claim 9 wherein said fin is positioned sufficiently forward of a rearward end of said body to permit limited side-to-side motion of said body during usage, and sufficiently rearward of a forward end of said body to prevent said body from rolling.

11. The fishing lure of claim 8 wherein when viewed from above said diving plane is sized with a plan area generally equal to the plan area of said body, and said attachment member is attached to said diving plane at a position with from about 20 to 30% of the combined plan area of said diving plane and said body forward thereof.

12. The fishing lure of claim 11 wherein said fin has a rearwardly inclined, forwardly facing blunted surface, and when viewed from the front said blunted surface has a frontal area generally equal to at least 5% of the frontal area of said body, and when viewed from the side said fin has a side profile area generally equal to at least 15% of the combined side profile area of said body and said fin.

13. The fishing lure of claim 12 wherein said body has a rearward end portion when viewed from the side which tapers rearwardly to a point to offer minimum resistance to side-to-side motion of said body.

14. A fishing lure, comprising:

a body;

a stabilizer fin fixedly attached to and projecting upwardly above said body to stabilize said body during usage, said fin being positioned sufficiently forward of a rearward end of said body to permit limited side-to-side motion of said body during usage, and sufficiently rearward of a forward end of said body to prevent said body from looping, said fin having a rearwardly inclined, forwardly facing blunted surface, and when viewed from said blunted surface having a frontal area generally equal to at least 5 % of the frontal area of said body, and when viewed from the side said fin having a side profile area generally equal to at least 15% of the combined side profile area of said body and said fin;

a diving plane fixedly attached to said body wall and projecting forwardly from said body to cause said body to dive during usage, when viewed from above said diving plane being sized with a plan area generally equal to the plan area of said body; and an attachment member fixedly attached to an upper surface of said diving plane for attachment of a fishing line to pull the lure during usage, said attachment member being attached to said diving plane at a position with from about 20 to 30% of the combined plane area of said diving plane and said body forward thereof.

15. The fishing lure of claim 14 wherein said body has a rearward end portion when viewed from the side which tapers rearwardly to a point to offer minimum resistance to side-to-side motion of said body.

16. An illuminated fishing lure for housing an elongated chemiluminescent capsule, comprising:

a substantially hollow body formed by a fish-like shaped thin wall fabricated of a translucent fluorescent polymer material having the property of capturing light, converting the light to fluorescent light, intensifying the light and emitting the light from edges at high brightness levels, said body wall defining an interior waterproof body cavity and having opposing sidewall portions each with an interior surface having formed integrally thereon a plurality of smooth surface portions facing generally inward each terminating in a surface discontinuity;

a translucent holder positioned transversely relative to said body, said holder removably retaining the chemiluminescent capsule and holding the capsule for illumination of said surface portions of said protrusions;

a double sided light reflective sheet centrally positioned within said cavity with each side thereof facing toward a corresponding one of said rearward sidewall portions of said body wall to reflect light generated by the capsule outward toward said sidewall portions, such that light reflected off said sheet and impinging on said smooth surface portions is emitted from said surface discontinuities.

17. The fishing lure of claim 16 further including:

a stabilizer fin fixedly attached to said body wall and projecting upwardly above said body to stabilize said body during usage;

a diving plane fixedly attached to said body wall and projecting forwardly from said body to cause said body to dive during usage; and an attachment member fixedly attached to said diving plane for attachment of a fishing line to pull the lure during usage.

18. The fishing lure of claim 17 wherein said fin has a rearwardly inclined, forwardly facing blunted surface to provide a generally rearward stabilizing resistive force on said body during usage to prevent said body from rolling.

19. The fishing lure of claim 18 wherein said fin is positioned sufficiently forward of a rearward end of said body to permit limited side-to-side motion of said body during usage, and sufficiently rearward of a forward end of said body to prevent said body from rolling.

20. The fishing lure of claim 17 wherein when viewed from above said diving plane is sized with a plan area generally equal to the plan area of said body, and said attachment member is attached to said diving plane at a position with from about 20 to 30% of the combined plan area of said diving plane and said body forward thereof.

21. The fishing lure of claim 20 wherein said fin has a rearwardly inclined, forwardly facing blunted surface, and when viewed from the front said blunted surface has a frontal area generally equal to at least 5% of the frontal area of said body, and when viewed from the side said fin has a side profile area generally equal to at least 15% of the combined side profile area of said body and said fin.

22. The fishing lure of claim 21 wherein said body has a rearward end portion when viewed from the side which tapers rearwardly to a point to offer minimum resistance to side-to-side motion of said body.

23. An illuminated fishing lure for housing an elongated chemiluminescent capsule, comprising:

a substantially hollow body formed by a wall fabricated of a translucent fluorescent polymer material, said body wall defining an interior waterproof body cavity and having opposing sidewall portions, at least one surface of said sidewall portions having formed thereon a plurality of smooth surface portions and surface discontinuities; and means for removably holding the chemiluminescent capsule in transverse position within said body for light transmitted from the capsule to impinge upon said sidewall surface portions and to be emitted from said surface discontinuities with a high brightness level.

* * * * *

UNITED STATES PATENT AND TRADEMARK OFFICE
CERTIFICATE OF CORRECTION

PATENT NO. : 4,700,504
DATED : October 20, 1987
INVENTOR(S) : Robert N. Mattison It is certified that error appears in the above-identified patent and that said Letters Patent is hereby corrected as shown below:

<u>In the claims</u>:

Claim 1, column 6, line 62, change "an" to --and--.

Claim 1, column 7, line 22, after the word "rearward" insert the word --sidewall--.

Claim 7, column 8, line 10, change "havinig" to --having--.

Claim 14, column 9, line 24, change "plane" to --plan--.

Signed and Sealed this

Tenth Day of May, 1988

*Attest:*

DONALD J. QUIGG

*Attesting Officer*      *Commissioner of Patents and Trademarks*